United States Patent [19]
Tannenbaum et al.

[11] 3,893,891
[45] July 8, 1975

[54] MULTIPLE DIFFUSION CHAMBER

[75] Inventors: Myron Tannenbaum, East Brunswick, N.J.; Joseph M. Kornfeld, Coventry, Conn.

[73] Assignee: New Brunswick Scientific Co., Inc., New Brunswick, N.J.

[22] Filed: June 14, 1973

[21] Appl. No.: 370,083

[52] U.S. Cl. ............... 195/127; 195/139; 195/143; 195/140
[51] Int. Cl.² .................................................. C12B 1/00
[58] Field of Search .......... 195/139, 142, 127, 143, 195/140

[56] References Cited
UNITED STATES PATENTS
| | | | |
|---|---|---|---|
| 3,083,145 | 3/1963 | Ryan | 195/139 |
| 3,186,917 | 6/1965 | Gerhardt et al. | 195/127 |
| 3,657,073 | 4/1972 | Burton et al. | 195/127 |

*Primary Examiner*—Alvin E. Tanenholtz
*Attorney, Agent, or Firm*—Blum Moscovitz Friedman & Kaplan

[57] ABSTRACT

Mixed culture interactions can be studied by providing a fluid tight housing defining a central diffusion reservoir for carrying a liquid culture nutrient medium. The housing is provided with a plurality of discrete radially extending organism growth chambers for culturing organisms in the liquid culture nutrient medium. Each organism growth chamber communicates with the central diffusion reservoir and each organism growth chamber is radially spaced on the periphery of the central diffusion reservoir. Each organism growth chamber is provided with means for controlling communication between the organism growth chamber and the central diffusion reservoir.

11 Claims, 7 Drawing Figures

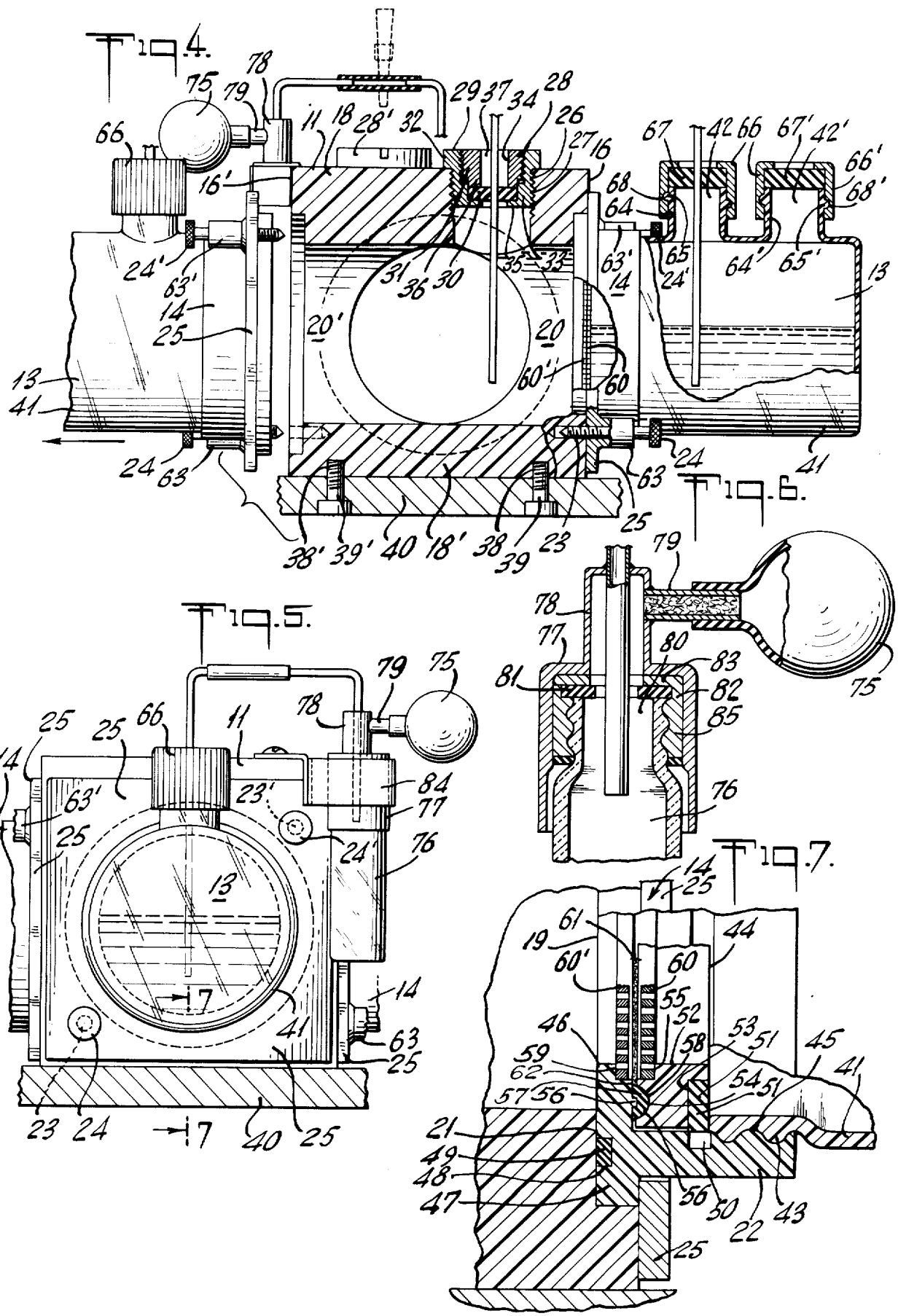

MULTIPLE DIFFUSION CHAMBER

BACKGROUND OF THE INVENTION

This invention relates to a device which provides mixed culture interactions under precisely controlled conditions. More particularly, the device employs multiple growth chambers in which cells are permitted to grow in pure culture, while the metabolic products of each interacting population dialyze freely to each chamber for influencing cell growth, metabolism, activity and function of the pure cultures.

Prior systems heretofore used to study mixed culture interactions are of limited utility, since in each prior system, the metabolic products of any given culture can only influence one other culture at a time if pure cultures are to be maintained. While some systems may be adapted for influencing more than one other culture, the adaptation leads to unknown interactions among cell populations with concomitant lack of controls and inability to correlate meaningful data.

Cellular interactions can simulate the natural state of the environment by producing some of the variations in the physical and chemical parameters encountered in nature. The instant invention provides means for accomplishing such simulation under precisely controlled conditions wherein cell populations employed remain pure and the effect of their interactions with metabolic products of other selected cell populations may be observed. For instance, interactions of the type described, in many instances, affect cell physiology, changes in cell size, respiratory capacity, pigment formation, and ultrastructure of the selected experimental cell populations. The instant invention provides means for selectively establishing controlled conditions under which a preselected number of interactions may be induced and their effects observed.

Among its advantages, the inventive device provides means for simulating, observing and studying cellular interactions in most environments, including soils, waters, oral cavities, digestive tracts and the like. Additionally, interactions among organisms not necessarily associated with a single environment can also be investigated, such as tissue cultures and bacteria as well as plant and animal cells.

SUMMARY OF THE INVENTION

Generally speaking, in accordance with the invention, a multiple diffusion chamber for studying mixed culture interactions under controlled conditions is provided which includes a fluid tight housing defining a central diffusion reservoir for carrying a liquid culture nutrient medium and a plurality of discrete radially extending fluid tight organism growth chambers for carrying organism cultures in the liquid culture nutrient medium. The organism growth chambers communicate with the central diffusion reservoir, are removably mounted thereon and are radially spaced on the periphery of the central diffusion reservoir housing. Each organism growth chamber is provided with means for controlling communication betweeen organism growth chambers and the central diffusion reservoir. The device may be mounted on a suitable shaker frame for subjecting it to controlled shaking for thereby providing uniform diffusion of culture metabolic products into each organism growth chamber.

Communication between organism growth chambers and the central diffusion reservoir may be controlled by providing each organism growth chamber with a filter membrane which selectively diffuses liquid culture nutrient medium and metabolic products of cultures there through but prevents culture diffusion thereby maintaining culture homogeneity within each discrete organism growth chamber while providing an interchange of metabolic products between interacting cell populations. A pair of back-up perforated screens, one on each side of the filter membrane, may be provided for supporting the filter membrane and for preventing rips, tears and perforations which may occur therein as a result of effluent flow into and from the organism growth chambers.

Procedurally, growth medium or liquid culture nutrient medium may be added to the organism growth chambers and central diffusion reservoir with subsequent autoclaving thereof. Each organism growth chamber is inoculated with a selected organism and the device is thereafter mounted on a shaker frame to provide efficient mixing and uniform dispersion of excretory products. In this fashion, the metabolic products of each organism contacts and affects the other organisms simultaneously while the cells continue to grow in pure culture.

Any suitable liquid culture nutrient medium which will dialyze through the filter membrane may be employed in the operating procedure. For instance, a natural medium may be employed such as plain or dextrose broth, and the like or a synthetic medium may be employed such as a medium containing amino acids of arginine, histidine, tyrosine, valine, leucine, isoleucine, and tryptophane, vitamins such as riboflavin, panthothenic acid, thiamine, folic acid, biotin, pyridoxine, and, as well, nicotinic acid, adenine, uracil and oleic acid may be employed. Also many different types of microorganisms may be cultured and their interactions studied in the device, for instance the microorganisms selected may be anaerobic or aerobic.

Still other uses and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a section on line 4—4 of FIG. 2 with parts broken away and in elevation;

FIG. 5 is an end view on line 5—5 of FIG. 2;

FIG. 6 is a fragmentary section on line 6—6 of FIG. 2, on a larger scale; and

FIG. 7 is a fragmentary section on line 7—7 of FIG. 6, on a larger scale.

DESCRIPTION OF THE PREFERRED EMBODIMENTS

Figure 1:
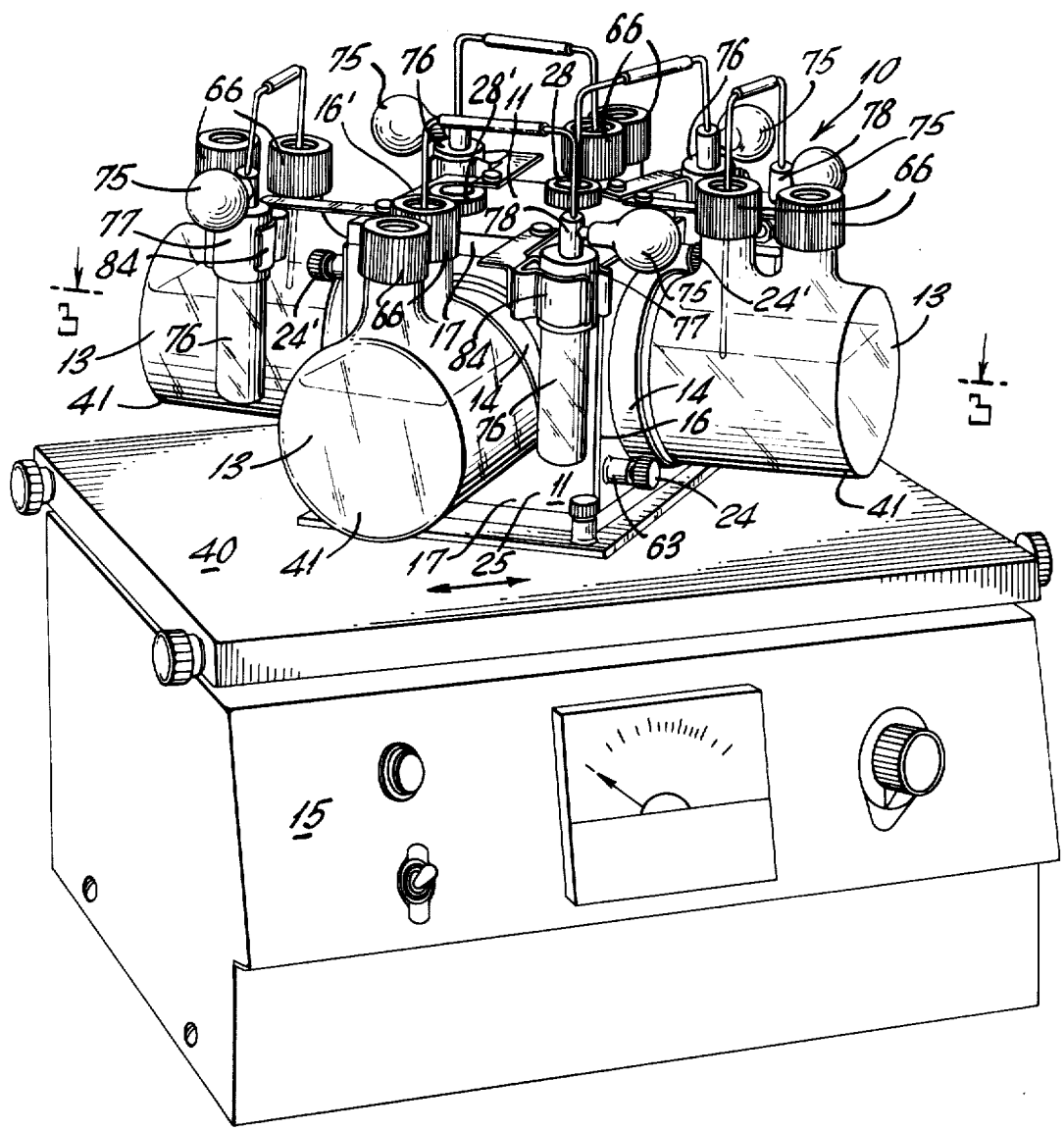
FIG. 1 is a perspective view of a preferred embodiment of the invention shown in connection with a shaker frame.
Figure 2:
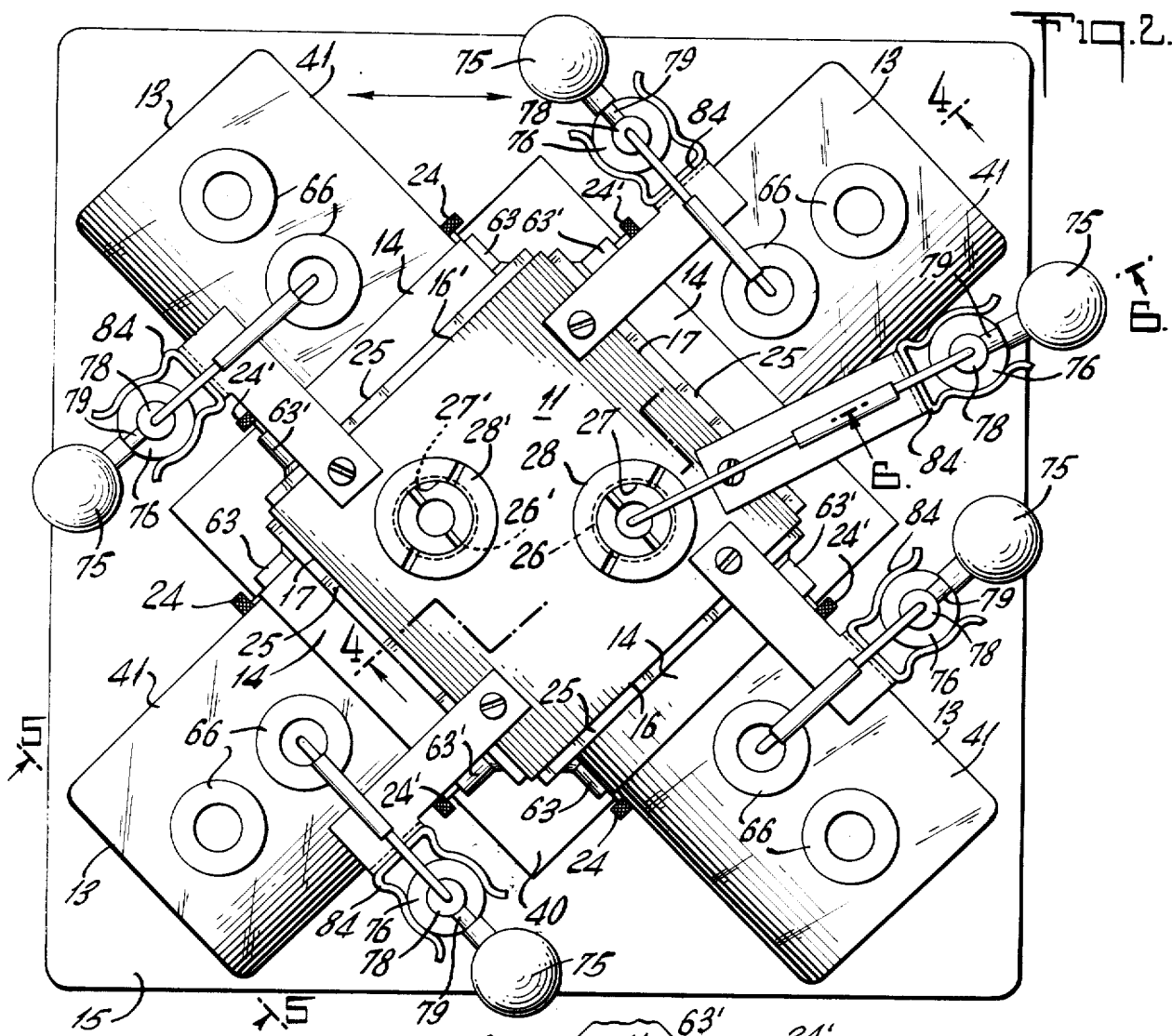
FIG. 2 is a top plan view of the embodiment shown in FIG. 1.

Referring now to FIGS. 1–7, a preferred multiple diffusion chamber design is shown. The multiple diffusion chamber, generally designated 10, basically comprises a central diffusion reservoir which communicates with a plurality of radially spaced organism growth chambers. Fluid tight, air tight housing 11 defines an internal central diffusion reservoir 12 which communicates with fluid tight, air tight organism growth chambers 13. Means 14 controls communication between central diffusion reservoir 12 and organism growth chambers 13. Shaker 15 affects forced but substantially uniform communication between central diffusion reservoir 12 and organism growth chambers 13.

Housing 11 includes oppositely disposed side wall panels 16, 16' and 17, 17' capped by oppositely disposed end wall panels 18, 18' to form an external casing for central diffusion reservoir 12. Housing 11 may be filled to be predetermined level with a liquid culture nutrient medium.

Side wall panels 16, 16' and 17, 17' are provided with circular apertures 19, 19' and 20, 20' for effluent interchange between organism growth chambers 13 and central diffusion reservoir 12. Structurally, each side wall panel of housing 11 may be identical with the others and each organism growth chamber may be identical with the others, therefore the detailed description of one serves as the description for all. Additionally, each organism growth chamber may be releasably connected to a respective side wall panel in the same way while each organism growth chamber may communicate with central diffusion reservoir 12 through identical means 14, therefore only one organism growth chamber mounting assembly and means 14 need be described in detail, recognizing that the description for one serves as the description for all.

Lip 21 of side wall panel 16 defines the perimeter of circular aperture 19 and is inwardly recessed for thereby providing a seat for an annular adapter collar 22 of organism growth chamber 13. Adapter collar 22 adapts organism growth chambers of varying sizes for communication with central diffusion reservoir 12 through circular aperture 19. In side wall panel 16 are a pair of interiorly threaded bores 23, 23' located in diagonal corners of side wall panel 16 for receiving threaded ends of threaded captive screws 24, 24' carried by clamp collar 25 for releasably clamping annular adapter collar 22 in the seat provided therefore by recessed lip 21 of side wall panel 16.

End wall panel 18 is provided with a pair of ports 26, 26' having interiorly threaded bores 27, 27' communicating with central diffusion reservoir 12. The ports may be provided, respectively, with air tight, liquid tight fittings 28, 28' as best seen in FIG. 4, fitting 28, for instance, includes collar 29, internal gasket 30 and interior bushing 31. To cap 32 overlying port 26, reduced diameter, exteriorly threaded stem 33 is connected for collar 29. Stem 33 threadably engages bore 27 of port 26. Collar 29 is provided with a partially threaded channel 34 for receiving gasket 30 and bushing 31 therein. Inwardly extending annular flange 35 of stem 33 provides underlying support for gasket 30 which laterally extends across channel 34. Exteriorly threaded bushing 31 threadably engages channel 34 and terminates in an unthreaded annular lower rim 36 which flush fits in the elbow provided between gasket 30 and the unthreaded portion of channel 34. Bushing 31 is provided with a channel 37 which is coaxial with channel 34 for receiving, for instance, means for sampling the effluent in central diffusion reservoir 12, means for filling central diffusion reservoir 12 with culture growth medium, means for pressurizing or drawing a vacuum on central diffusion reservoir 12 and the like.

Underside end wall panel 18' of housing 11 is provided with a pair of threaded bores 38, 38' for receiving ends of screws 39, 39' threaded through shaker frame 40 of shaker 15 for releasably mounting multiple diffusion chamber 10 on shaker 15. Threaded bores 38, 38' partially penetrate end wall panel 18' without communication with central diffusion reservoir 12.

Organism growth chamber 13 includes cylindrical container 41 provided with upright ports 42, 42' and exteriorly threaded neck portion 43 terminating in container mouth 44 for access and egress to central diffusion reservoir 12. As best seen in FIG. 7, neck 43 of container 41 threadably engages adapter collar 22 which includes interiorly threaded tubular neck 45 and terminates in aligned interiorly and exteriorly extending annular flanges 46, 47. In recessed lip 21 of side wall panel 16 sit aligned flanges 46, 47 with flange 46 extending beyond lip 21 for supporting means 14. On its seating surface in lip 21 adapter collar 22 is provided with annular notch 48 in which O-ring 49 is received for sealing adapter collar 22 against lip 21. Flush with the end of the threading, tubular neck 45 is provided with annular notch 50 which is a thread relief for washer 51 sealed between the rim of container mouth 44 and annular support 52.

In support 52 which provides an interior ballast between the rim of container mouth 44 and flange 46 of annular collar 22, three annular notches 53, 54 and 55 are formed for, respectively, accommodating washer 51, receiving O-ring 56, and supporting means 14. The interior side wall of flange 46 is provided with an annular crown 57 received in annular notch 58 of O-ring 56 for sealing support 52 against flange 46.

Opposite notch 55 in support means 52 flange 46 is provided with a mirror image annular notch, notch 59. Circular mesh screens 60, 60' are fixedly supported in respective mirror image notches 55 and 59. A semipermeable filter membrane 61 is provided between mesh screens 60, 60' for allowing only metabolic products of interacting cell populations to diffuse uniformly to other organism growth chambers. Between the interface of flange 46 and support 52 there is provided an annular slot 62 bottomed by O-ring 56 in which the peripheral margin of filter membrane 61 is received for thereby supporting filter membrane 61 between mesh screens 60, 60'. There is an axial clearance between both sides of filter membrane 61 and respective mesh screens 60, 60' for limited axial movement of filter membrane 61 therebetween.

As best seen in FIGS. 4 and 7, clamp collar 25, encircles adapter collar 22 and overlies flange 47 and side wall panel 16 for releasably clamping organism growth chamber 13 on side wall panel 16 for registration of container mouth 44 with aperture 19 in side wall panel 16 thereby providing a coaxial arrangement among aperture 19, mesh screens 60, 60', filter membrane 61 and container 41. Clamp collar 25 is provided with a pair of diagonally disposed interiorly threaded extensions 63, 63' for carrying threaded captive screws 24, 24'. Threaded bores of extensions 63, 63' are registered with threaded bores 23, 23' carried in side wall panel 16 and screws 24, 24' are threaded therein for thereby releasably clamping organism growth chamber 13 on side wall panel 16.

Upright ports 42, 42' are provided respectively with annular neck portions 64, 64' integrally connected to container 41 and each neck portion is provided with a thread 65, 65' for releasably securing respective caps 66, 66' thereto. Overlying respective ports 42, 42' are respective rubber diaphragms 67, 67' releasably secured over ports 42, 42' by caps 66, 66'; caps 66, 66' being provided with respective annular grooves 68, 68' which accommodate respective threads 65, 65' for securing overlying rubber diaphragms 67, 67' in position. The top panels of caps 66, 66' are apertured for access to the interior of container 41 through rubber diaphragms 67, 67'. Access to the interior of container 41 may be needed for filling the container with culture growth medium, inoculating the medium with a selected organism, sampling, aeration, gassing, pH probes and the like.

As best seen in FIGS. 4, 5 and 6, a culture in container 41 may be sampled by inserting one end of a U-tube through diaphragm 67 into the culture for sampling with the other leg of the U-tube leading to a hooded sampler. The U-tube may be sectioned with a rubber tubing connecting the sections and a shuttlecock type valve may be simulated by fastening an adjustable clip across the rubber tubing for cutting off the sample flow. The sample may be drawn by depressing flexible bulb 75 to expel air therefrom and drawing a sample from container 41 which deposits in sample container 76. Collar 77 removably mounted on sample container 76 includes neck portion 78 provided with arm 79 on which bulb 75 is mounted. Arm 79 is packed with suitable filtering material for filtering air expelled from bulb 75 prior to drawing the sample.

Sample container 76 is provided with an exteriorly threaded neck defining the container mouth 80. Overlying container mouth 80 is an apertured gasket 81 for receiving the U-tube leg there through. Interiorly threaded cap 82 threadably engages the neck of sample container 76 and is provided with an aperture in its top panel 83 which is substantially coaxial with the aperture provided in gasket 81 and neck portion 78 of collar 77. Threaded side walls 85 of cap 82 terminate in an annular gasket with which cap 82 is provided for maintaining an air tight, liquid tight seal between sample container 76 and collar 77 overlying cap 82. The sampler may be suitably secured to housing 11, for instance by sampler support 84 bolted at one end to end wall panel 18.

In practice, central diffusion reservoir 12 and organism growth chambers 13 may be filled with a suitable culture growth medium through respective ports 26 and 42, the ports being thereafter sealed respectively with fitting 28 and cap arrangement 66 and the device 10 being autoclaved for sterilizing the medium and device. If the medium is composed of heat-labile substrates, these may be added aseptically through ports 26 and 42 after sterilization. Each chamber is then inoculated with a selected organism through, for instance, sterile diaphragm 67. The device is mounted on a conventional shaker 15, as heretofor described, to provide efficient mixing and uniform dispersion of excretory products. In this fashion, the metabolic products of each organism contacts and affects the other organisms simultaneously while the organisms continue to grow in pure culture within individual organism growth chambers 13.

Each organism growth chamber is faced with a means 14 for diffusing only metabolic products from individual organism growth chambers 13 to other interacting cell populations. Membrane filter 61 is therefore suitably selected for a porosity which diffuses culture growth medium and metabolic products of cultures but prevents culture diffusion thereby maintaining culture homogeneity within each discrete organism growth chamber 12, while providing an interchange of metabolic products between interacting cell population.

As hereinbefore described cultures may be periodically sampled and variations therein analyzed. As well, the contents of central diffusion reservoir may be sampled to determine the make-up thereof by a sampler of the type described in connection with organism growth chamber 13.

Figure 3:
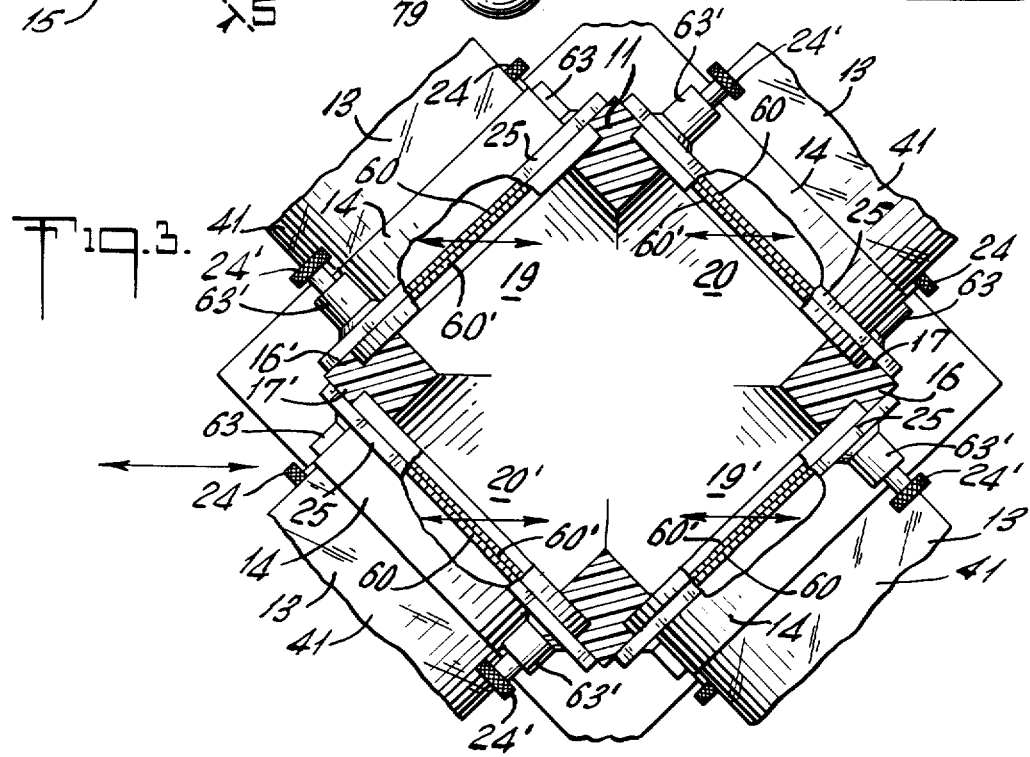
FIG. 3 is a fragmentary cross-sectional view of the embodiment shown in FIG. 1 taken on the line 3—3.

While any conventional shaker may be used to agitate the contents of multiple diffusion chamber 10, it is preferably that the shaking be reciprocatory. When a reciprocating shaker is employed for agitating multiple diffusion chamber 10, organism growth chambers 13 are preferably mounted on housing 11 in a manner which places them equiangularly distant from the axis of reciprocation for the shaker. As best seen in FIG. 3, in such an arrangement substantially uniform diffusion occurs in both directions through membrane filter 61.

While in the embodiment shown up to four interacting populations may be investigated at once, organism chambers 13 may be readily removed for investigation of the growth characteristics of a single microorganism compared with two, three or four interacting populations. Among its advantages, the device maintains culture homogeneity of interacting cell populations for collecting information concerning changes in cell size, respiratory capacity, pigment formation, ultrastructure and the like which may occur as a result of the interactions. Additionally, the device provides means for comparing growth characteristics of microorganisms growing individually and in conjunction with one another in the chamber.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A multiple diffusion chamber for mixed culture interactions under controlled conditions comprising a fluid tight housing defining a central diffusion reservoir for carrying a liquid culture nutrient medium, a plurality of discrete radially extending fluid tight organism growth chambers for carrying organism cultures in said liquid culture nutrient medium, said organism growth chambers communicating with said central diffusion reservoir, each organism growth chamber being radially spaced on the periphery of said central diffusion reservoir housing and connected thereto, each organism growth chamber including means for selectively controlling communication between organism growth chambers and said central diffusion reservoir for thereby permitting continuous dialysis of said culture nutrient medium and metabolic products suspended therein into and out of each of said organism growth chambers and preventing egress of an organism culture therefrom, and means for shaking said multiple diffusion chamber for thereby affecting communication between said central diffusion reservoir and each of said organism growth chambers.

2. The multiple diffusion chamber of claim 1 wherein said shaking means is a reciprocal shaker for thereby affecting substantially reciprocal controlled communication between said central diffusion reservoir and each of said organism growth chambers.

3. The multiple diffusion chamber of claim 1 wherein said means for controlling communication between said organism growth chambers and said central diffusion reservoir includes a membrane filter characterized by a porosity which diffuses liquid culture nutrient medium and metabolic products of cultures there through but prevents culture diffusion thereby maintaining culture homogeneity within each discrete organism growth chamber, while providing an interchange of metabolic products between interacting cell populations.

4. The multiple diffusion chamber of claim 1 including means for sampling the content of said plurality of discrete organism growth chambers, said sampling means providing for sterile withdrawal of a sample for further analysis thereof.

5. The multiple diffusion chamber of claim 1 including means for sampling the content of said central diffusion reservoir, said sampling means providing for sterile withdrawal of a sample for further analysis thereof.

6. The multiple diffusion chamber of claim 1 wherein each organism growth chamber is provided with at least one port for inoculating each organism growth chamber with a selected organism.

7. The multiple diffusion chamber of claim 2 wherein said reciprocal shaker linearly reciprocates said multiple diffusion chamber and said organism growth chambers are equiangularly distant from the axis of reciprocation for said shaker for uniformly agitating cultures and culture nutrient medium which may be carried, respectively, in said plurality of discrete radially extending organism growth chambers and said central diffusion reservoir whereby metabolic products of said cultures in said discrete organism growth chambers may dialyze through said means for controlling communication between said organism growth chambers and said central diffusion reservoir, disperse through said culture nutrient medium and dialyze with said culture nutrient medium through said last mentioned means, with substantially equal probability, into said plurality of organism growth chambers, each discrete organism growth chamber carrying a substantially constantly homogeneous culture.

8. The multiple diffusion chamber of claim 3 wherein said means for controlling communication between said organism growth chambers and said central diffusion reservoir further includes first and second mesh screens, said mesh screens being in parallel alignment and coaxial, one with another, one of said mesh screens being positioned on either side of said membrane filter, said first and second mesh screens being coaxial with said organism growth chamber and being fixedly mounted therein, an axial clearance being provided between said first and second mesh screens for limited lateral axial movement of said membrane filter.

9. The multiple diffusion chamber of claim 6 including a sterile diaphragm removably mounted on said organism growth chamber over said port opening, and means for providing an air tight, liquid tight seal between said sterile diaphragm and the rim of said organism growth chamber defining said port.

10. The multiple diffusion chamber of claim 8 wherein said membrane filter is spaced apart from said first and second mesh screens for limited oscillating movement therebetween.

11. A multiple diffusion chamber for mixed culture interactions under controlled conditions comprising a fluid tight housing defining a central diffusion reservoir for carrying a liquid culture nutrient medium, a plurality of discrete radially extending fluid tight organism growth chambers for carrying organism cultures in said liquid culture nutrient medium, said organism growth chambers communicating with said central diffusion reservoir, each organism growth chamber being radially spaced on the periphery of said diffusion reservoir housing and connected thereto, each organism growth chamber including means for selectively controlling communication between organism growth chambers and said central diffusion reservoir for thereby permitting continuous dialysis of said culture nutrient medium and metabolic products suspended therein into and out of each of said organism growth chambers and preventing egress of an organism culture therefrom, each organism growth chamber having at least one port for innoculation each organism growth chamber with a selected organism, and a sterile diaphragm removably mounted on said organism growth chambers over said port openings therein, and means for providing an air tight, liquid tight seal between said sterile diaphragm and the rim of said organism growth chamber defining said port.

* * * * *